(12) United States Patent
Calochira et al.

(10) Patent No.: US 8,055,265 B2
(45) Date of Patent: Nov. 8, 2011

(54) METHOD AND SYSTEM FOR SELECTING RADIATION DIAGRAMS OF ANTENNAS FOR MOBILE-RADIO COMMUNICATION NETWORKS

(75) Inventors: Giorgio Calochira, Turin (IT); Francesco Epifani, Turin (IT); Michele Ludovico, Turin (IT); Giuseppe Minerva, Turin (IT); Daniela Mirra, Turin (IT); Massimiliano Panico, Turin (IT); Massimiliano Petra, Turin (IT); Emanuele Silio, Turin (IT); Loris Stola, Turin (IT)

(73) Assignee: Telecom Italia S.p.A., Milan (IT)

( * ) Notice: Subject to any disclaimer, the term of this patent is extended or adjusted under 35 U.S.C. 154(b) by 523 days.

(21) Appl. No.: 11/922,935

(22) PCT Filed: Jun. 30, 2005

(86) PCT No.: PCT/EP2005/007062
§ 371 (c)(1),
(2), (4) Date: Apr. 1, 2009

(87) PCT Pub. No.: WO2007/003205
PCT Pub. Date: Jan. 11, 2007

(65) Prior Publication Data
US 2009/0305638 A1  Dec. 10, 2009

(51) Int. Cl.
*H04W 40/00* (2009.01)
(52) U.S. Cl. .............. 455/446; 455/422.1; 455/522; 455/67.3; 455/562.1
(58) Field of Classification Search ............. 455/422.1, 455/446, 522, 67.3, 562.1
See application file for complete search history.

(56) References Cited

U.S. PATENT DOCUMENTS

| | | | |
|---|---|---|---|
| 6,104,936 A | 8/2000 | Kronestedt | |
| 6,445,688 B1 | 9/2002 | Garces et al. | |
| 7,096,040 B1 * | 8/2006 | Scherzer et al. | 455/562.1 |
| 2002/0068612 A1 * | 6/2002 | Carey et al. | 455/562 |
| 2003/0171131 A1 | 9/2003 | Kettering et al. | |
| 2004/0166902 A1 * | 8/2004 | Castellano et al. | 455/562.1 |

FOREIGN PATENT DOCUMENTS

| | | |
|---|---|---|
| WO | WO 02/35872 A | 5/2002 |
| WO | WO 03/045094 A | 5/2003 |
| WO | WO 2005/004515 A | 1/2005 |

* cited by examiner

*Primary Examiner* — Kwasi Karikari
(74) *Attorney, Agent, or Firm* — Finnegan, Henderson, Farabow, Garrett & Dunner, L.L.P.

(57) ABSTRACT

The radiation diagram of an antenna for serving a cell in a cellular communication network is selected from a plurality of available radiation diagrams by: classifying the plurality of available radiation diagrams in terms of a related radiation gain value; identifying for each one of the sectors a plurality of variations of the radiation gain value associated with the available radiation diagrams; estimating for each sector an initial value of at least one indicator of network operative functionality; estimating for each sector at least a desiderate value of variation of the related radiation gain value; and selecting at least one configuration that approximates the variation of the radiation gain value involving the desiderate value.

14 Claims, 10 Drawing Sheets

METHOD AND SYSTEM FOR SELECTING RADIATION DIAGRAMS OF ANTENNAS FOR MOBILE-RADIO COMMUNICATION NETWORKS

CROSS REFERENCE TO RELATED APPLICATION

This application is a national phase application based on PCT/EP2005/007062, filed Jun. 30, 2005, the content of which is incorporated herein by reference.

FIELD OF THE INVENTION

The present invention relates to techniques for selecting the radiation diagrams of antennas.

The invention has been developed with particular attention to the problems concerning the selection of radiation diagrams of antennas to be installed in a set of radio base stations (RBSs) associated to the cells comprised in a mobile-radio communication network.

DESCRIPTION OF THE RELATED ART

In the field of telecommunication systems, and in particular in the sector of radio base stations (RBSs) belonging to a mobile-radio communication network, the antenna (or more in general the so-called radiating system) represents the final element of a system chain comprising modulators-demodulators, filters, amplifiers, splitters, cables, which are set upstream of the antenna. Such system chain determines the level of useful signal present on the territory and, consequently, the resulting area of electromagnetic coverage associated to a generic cell. In this context, the geographical overlapping of the coverages due to the various cells active in a mobile-radio communication network determines the distribution over the territory both of the level of the useful signal and of the levels associated to the various interfering signals and, hence, of the total interference. These aspects can affect the final performance of a network based upon connections of the radio type.

In the stage of design and planning of a mobile-radio communication network, an important role can be played by the process of selection of the electromagnetic characteristics of the antennas installed in the radio base stations. In this connection, it is known that the electromagnetic characteristics of an antenna can be expressed through the radiation diagram, which is in turn defined in relation to the characteristics of a reference radiator, in general assumed as the ideal isotropic antenna (i.e., an antenna that irradiates power evenly in all directions).

This process of selection depends upon the general conditions of the mobile-radio communication network. These can be represented by a wide set of parameters such as, for example, the network technology (GSM, GPRS, EDGE, UMTS, mixed, etc.), the conformation of the territory (in terms of topography and morphology), the distribution of the traffic offered (position and volume of the traffic that is assumed to request that particular service or package of services supported by the network), and the geographical arrangement of the radio base stations adjacent to a radio base station considered. The process of selection depends also, and not secondarily, upon the number of the types of antennas and hence upon the shape of the radiation diagram on which the choice may be made.

As regards the stage of planning and design of a mobile-radio communication network, some solutions are known aimed at determining the optimal radiation diagram.

Document WO-A-2005/004515 describes a communication network including a plurality of antennas. The communication network is configured by: including among the antennas at least one reconfigurable antenna adapted to serve communication traffic in a respective coverage area, the reconfigurable antenna having a radiation diagram exhibiting a plurality of selectively adjustable gain values for a set of directions, each direction in the set defining a propagation path between the antenna and a portion of the coverage area; determining, for each direction in the set, at least one value of communication traffic and at least one attenuation value over the propagation path, and selectively and independently allotting to each direction in the set a respective gain value as a function of at least one of the value of communication traffic and the attenuation value determined for that direction.

The document WO-A-03/045094 discloses systems and methods which provide communication-network antenna-pattern configuration for optimized network operation. Preferably, a statistical smart-antenna configuration is provided in which antenna patterns associated to various base stations of the communication network are configured to capitalize on the complex morphology and topology of the service area in providing optimized communications.

Antenna patterns are preferably configured using merit-based determinations, based upon link-propagation conditions, such as ones associated to the complex morphologies and topologies of the service area, in order to serve aggressively areas that are best served thereby, while not serving areas that are best served by other network systems.

In U.S. Pat. No. 6,445,688a method and a system are provided to determine and thus select the best choice of antenna to be used by a network device having a plurality of directional antennas for a particular sending source.

The determination is made using a metrics based upon the success rate of packets received at a particular directional antenna from the sending source and secondarily upon a received-signal-strength indicator. The determination is stored and made available for processing in such a way that a router will be able to request communication through a device with a destination via the second wireless-communication device without knowledge of the best antenna match.

In a specific method, the first communication device broadcasts packets, via each associated directional antenna, to query for the existence of the second wireless-communication devices. The first device then receives a plurality of information packets about existence of the second wireless-communication devices in response to the broadcast packets or in response to a query about third parties. As between each directional antenna and each second wireless-communication device, a packet success metrics is determined for each directional antenna, which becomes the basis for antenna selection.

OBJECT AND SUMMARY OF THE INVENTION

The Applicant has observed that in the planning and design of a mobile-radio communication network, for example a second-generation (GSM/GPRS/EDGE) or third-generation (W-CDMA/UMTS) one, there exists the problem of automating the choice of the radiation diagram (in terms of horizontal plane H and vertical plane V) to be associated to each of the antennas installed in the radio base stations (RBSs) of the mobile-radio network itself. In fact, a better exploitation of the radiating characteristics of the RBSs implies not only a better level of service guaranteed by the network but also, in many cases, a considerable reduction in the number of RBSs to be installed.

The invention solves the above-stated problem by means of a technique for selection of the antenna diagram which operates on the basis of a set of indicators of network operative functionality (for example, the covered area, the carried traffic, the level of useful signal, the interference) defined by means of a planning/analysis tool according both to the technology of the mobile-radio network considered (for example, second-generation or third-generation networks) and to the characteristics of the planning tool itself.

Such indicators of operative functionality regarding the network are then translated at each cell into a reduced number of requirements (desiderata) and organized e.g. in a matrix form. In particular, for each portion of territory defined through a process of sectoring of each cell, the aforesaid requirements are correlated to the need to increase, decrease, or leave unaltered the level of useful signal in order to control as good as possible the area covered, the level of interference, the carried traffic, etc.

In a preferred way, in parallel to the step of evaluation of the desiderata, a matrix referred to as "antenna transition-gain matrix", associated to the set of radiation diagrams available, is also evaluated. Irrespective of the network configuration considered and for each possible choice of a new diagram, said matrix quantifies the effects of the variation of the antenna diagram on the resulting coverage of the cell by means of a digital-encoding synthesis formalism (i.e., more gain, less gain, the same gain).

The joint use of the cell desiderata and of the effects of antenna transition expressed by the transition-gain matrix may be translated into the definition of a further matrix referred to as "advantage-of-transition matrix", which renders automatic the operations of selection of the best transition from the current diagram of a generic cell to a new diagram amongst the ones available, said transition being aimed at solving the specific requirements (expressed by the desiderata) of the cell examined.

According to the present invention the best transition can also comprise the selection of the current radiation diagram.

According to the present invention, the above-stated problem is solved by means of a method having the features set forth in the claims that follow. The invention also relates to a corresponding system, a corresponding network as well as a corresponding computer-program product, which can be loaded into the memory of at least one computer and includes software-code portions for performing the steps of the method of the invention when the product is run on a computer. As used herein, reference to such a computer-program product is intended to be equivalent to reference to a computer-readable medium containing instructions for controlling a computer system to co-ordinate the performance of the method of the invention. Reference to "at least one computer" is evidently intended to highlight the possibility for the present invention to be implemented in a distributed/modular fashion.

The claims are an integral part of the disclosure of the invention provided herein.

A preferred embodiment of the invention provides for a method for selecting, from a plurality of available radiation diagrams, the radiation diagram of an antenna for serving a cell in a mobile-radio communication network, characterized in that it includes the steps of:

classifying said plurality of available radiation diagrams in terms of a related radiation gain value associated to each sector of a plurality of sectors in which each cell of said mobile-radio communication network is partitioned;

identifying for each one of said sectors a plurality of variations of said radiation gain value associated to a plurality of variations of configuration of said available radiation diagrams;

estimating for each sector an initial value of at least one indicator of network operative functionality;

estimating for each sector at least a desiderate value of variation of the related radiation gain value which involves an improvement of said initial value of said at least one indicator of network operative functionality;

selecting, in said plurality of variations of configuration of available radiation diagrams, at least one configuration that approximates said variation of said radiation gain value involving said desiderate value.

The solution described herein can lead to an optimal choice of the antenna diagram in the stage of design and planning of a mobile-radio communication network considering solutions that comprise both traditional antennas (constant radiation diagram) and reconfigurable antennas (modifiable radiation diagram). In addition, the solution described herein is readily usable within solutions that enable analysis in terms of performance and planning of mobile-radio networks (see, e.g. the solution described in the document WO-A-02/35872).

BRIEF DESCRIPTION OF THE ANNEXED DRAWINGS

The invention will now be described, purely by way of example, with reference to the enclosed figures of drawing, wherein.

DETAILED DESCRIPTION OF A PREFERRED EMBODIMENT

Figure 1:
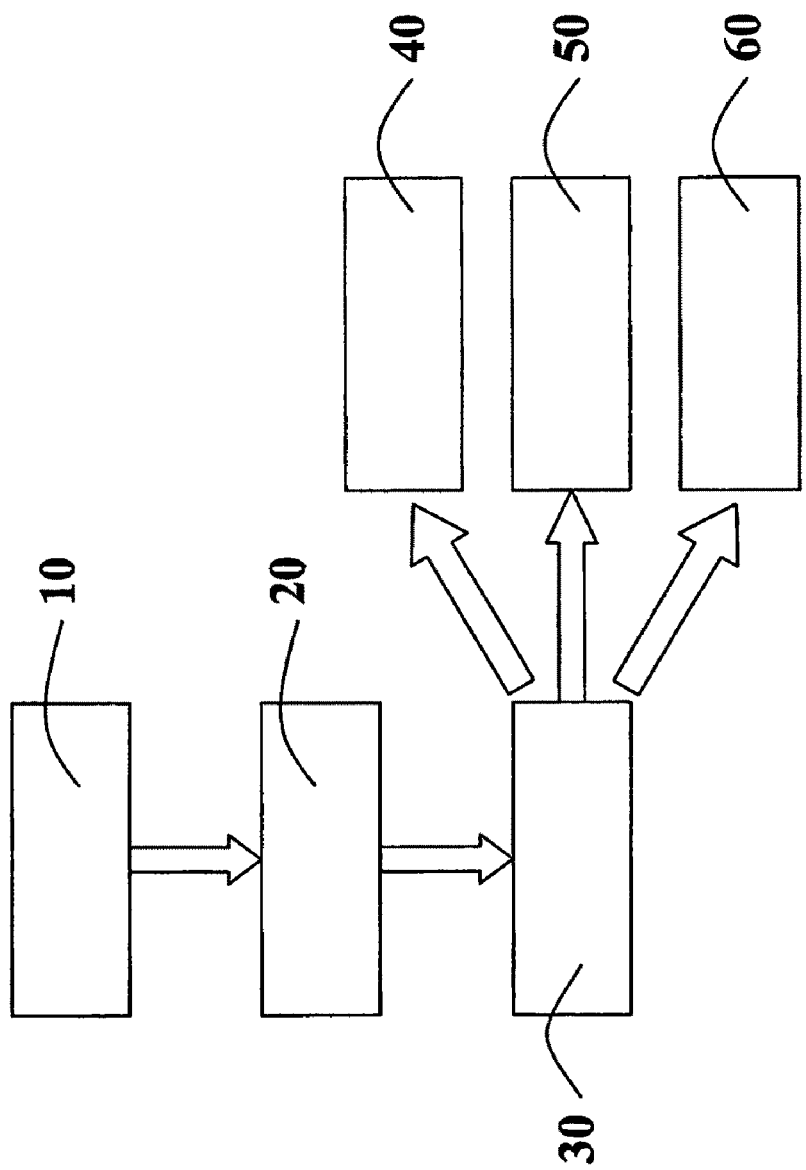
FIG. 1 is a functional block diagram exemplary of a set of operations to be carried out according to the present invention.

The method for selecting the radiation diagrams of antennas to be installed in a set (or subset) of radio base stations (RBSs) associated to the cells comprised in a mobile-radio communication network can be applied both to second-generation mobile-radio networks (GSM/GPRS/EDGE) and to third-generation mobile-radio networks (W-CDMA/CDMA 2000/UMTS).

For the purposes of the present description, it is useful to highlight the fact that the wording "radio base station" of a mobile-radio communication network is meant to indicate herein the set comprising the fixed apparatuses (i.e., the system chain cited previously) upstream of an antenna (even fixed) and the antenna itself. For reasons of greater simplicity, in the sequel of the description it is assumed that the characteristics (for example, the maximum power transmitted, the operating frequency, the encoding used, etc.) of these fixed apparatuses are maintained constant.

It is moreover assumed that associated to each RBS is at least one cell, which, for the purposes of the present description, assumes the meaning of a portion of territory on which the RBS exerts its influence both at the level of useful signal and at the level of interfering signal. For greater simplicity and clarity of exposition, only one antenna/cell for each radio base station will, however, be considered, but that assumption does not limit the generality of what is illustrated hereinafter.

Furthermore, it will be assumed that the set of antennas considered for the purposes of selection is formed in part by antennas of a traditional type and in part by antennas of a reconfigurable type.

By "antennas of a traditional type" are, in general, meant antennas having a radiation diagram that is constant, i.e., not modifiable after installation of the antenna in the network, unless interventions in loco are carried out. Usually, a radiation diagram of this type of antenna comprises at most a main lobe, which, according to the type of model of antenna and/or manufacturer, may differ in terms of shape (both in azimuth and elevation) and gain in the direction of maximum efficiency.

In this case, the technique of selection described herein aims at identifying the model of antenna (amplitude of the main lobe and gain) and the corresponding physical pointing (azimuth and tilt) most appropriate for the purposes of a good network planning. Once said quantities have been fixed, they constitute the specific techniques used in the step of installation of the antenna and remain constant, unless interventions in loco are carried out, such as, for example, mechanical variations of the pointing or replacement of the model of antenna.

By "antennas of a reconfigurable type" are, instead, meant antennas having a radiation diagram that can be reconfigured in the horizontal plane H and vertical plane V even after installation in the network of the antenna itself. In order to obtain reconfigurability of the radiation diagram, these antennas are generally formed by an array of elements supplied so as to obtain the desired shape of the diagram. In general, an antenna of a reconfigurable type can present radiation diagrams having articulated shapes, characterized, for example, by the presence of a number of lobes, the number and amplitude of which is conditioned by the number of radiating elements comprised in the antenna apparatus itself.

In this latter case, the technique of selection described herein has the purpose of identifying, in the set of the possible diagrams that can be obtained with the reconfigurable technology, the shape of the antenna diagram and the corresponding physical pointing (azimuth and tilt) most suitable for the solution of particular critical aspects, such as, for example, the orographic conformation of the territory (and hence the difficulty in guaranteeing coverage), the concentration of the traffic offered (and hence problems of capacity), the conditions of marked interference, etc., present in the territory involved in the planning.

The technique of automated selection of antenna diagrams described herein comprises a set of operations to be carried out, according to the steps illustrated in FIG. 1, in relation to an initial set of available antennas comprising both antennas of a traditional type and antennas of a reconfigurable type.

These operations, described in detail in what follows, can be carried out in a single solution, prior to the framing of any hypothesis of network design and planning whatsoever.

In the sequel of the present description, an antenna will be considered as being exhaustively represented by the shape of the corresponding radiation diagram, understood as gain G with respect to an isotropic antenna in azimuth and elevation (horizontal plane H and vertical plane V). The two concepts (antenna and radiation diagram) will consequently be considered equivalent. Instead, by "radiating physical structure" or "radiating system" is meant the antenna in a concrete sense, which, in the case of a technology of a traditional type, is equivalent to just one antenna or radiation diagram, whereas, in the case of a technology of a reconfigurable type, it corresponds to as many antennas or radiation diagrams as are the different solutions that can be obtained by varying the supply of the radiating elements that make up the antenna itself.

With reference to FIG. 1, in a step 10, a database of the real available antennas is formed. In the sequel of the present description, by "real antennas" will be understood ones which are represented by an initial set of radiation diagrams actually available and which can be installed in a radio base station of a mobile-radio network. Said set comprises both traditional antennas having a constant radiation diagram and reconfigurable antennas. In the case of antennas of a traditional type, corresponding to each radiating physical structure is a single and well-defined radiation diagram, whereas, in the case of antennas of a reconfigurable type, each radiating physical structure can produce a multiplicity of radiation diagrams, which is equivalent to having an equal multiplicity of antennas of a traditional type.

It is hence assumed that $N_{anrea}$ real radiation diagrams or real antennas which provide the database of real antennas are available for use.

With reference to FIG. 1, in a step 20, a number of virtual antennas is defined.

By "virtual antennas" are meant herein antennas represented by shapes of radiation diagram obtained as the physical pointing in a radiating system, whether a traditional or reconfigurable one, varies. This approach proves advantageous since it makes it possible to treat in a similar way the solutions that envisage replacement of a radiating system and those solutions that, instead, envisage variations in pointing, i.e., in azimuth and elevation, of the radiating system.

As is known to persons skilled in the sector of planning of mobile-radio communication networks, the set of the pointing values and consequently the number of virtual antennas can be considered discretized and hence limited without this implying any loss of generality.

Consequently, in what follows, the number of paintings considered in the horizontal plane (azimuth) will be designated by $N_{anvirH}$ and the similar number of paintings in the vertical plane (elevation or tilt) will be designated with $N_{anvirV}$. As a result, in the context considered herein $N_{anvirH}$ and $N_{anvirV}$ represent the number of virtual-antenna solutions obtained by varying the pointing in the planes H and V, respectively (defined in what follows as antennas of type H and antennas of type V, respectively). On account of the independence of the two planes, the total number of virtual antennas is thus equal to $N_{anvirH} * N_{anvirV}$.

With reference to FIG. 1, in a step 30 the global database of available antennas (i.e. the different radiation diagrams to choose from) is formed.

The three types (one real and two virtual) of antenna diagrams taken into consideration represent a total set of antenna solutions available for the radiating characteristics, where by "antenna solution" is meant the operation that corresponds to fixing a "state" for each of the three types considered, namely:
- type of antenna (real shape);
- value of pointing in azimuth (virtual shape);
- value of pointing in elevation (virtual shape).

On account of the independence of the three types listed above, the total number of antenna solutions, or usable antenna diagrams $N_{antot}$, is given by the product of the number of possible "states" characterizing each type of antenna:

$$N_{antot} = N_{anrea} \times N_{anvirH} \times N_{anvirV} \tag{1}$$

where $N_{antot}$ is the total number of antenna solutions.

Figure 2:
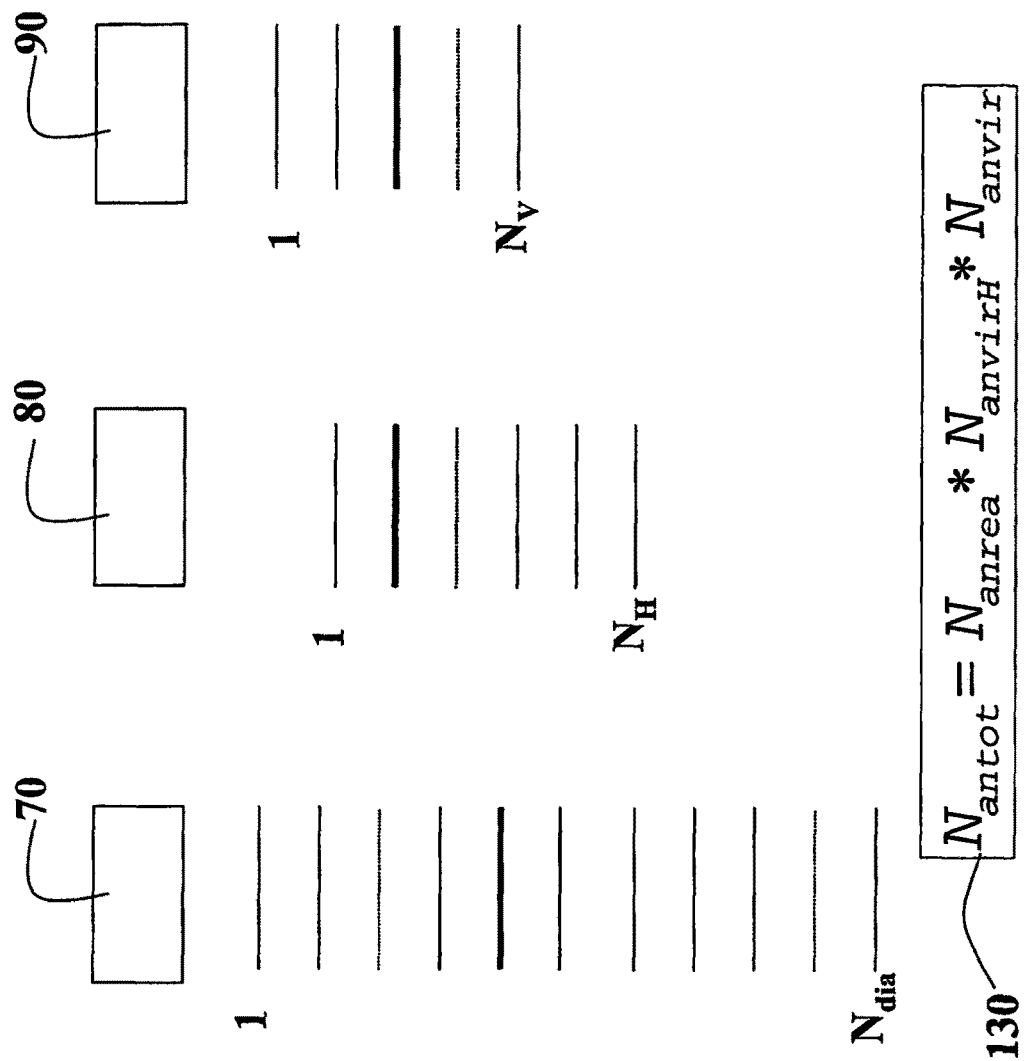
FIG. 2 shows an example of classification and number of available antenna diagrams.

Equation (1) is obtained according to the scheme of FIG. 2. Indicated in particular in column 70 are the real shapes $N_{anrea}$ (i.e., the models of antenna) in a number that ranges from 1 to $N_{dia}$.

Indicated in the column 80 are the virtual shapes $N_{anvirH}$ (i.e., the rotations in the horizontal plane H) in a number that ranges from 1 to $N_H$.

Indicated in the column 90 are the virtual shapes $N_{anvirV}$ (i.e., the rotations in the vertical plane V) in a number that ranges from 1 to $N_V$.

With reference to FIG. 1, in steps 40, 50, and 60, the operation of definition and evaluation of the transition-gain matrix is performed.

In particular, in step 40, there is defined and evaluated the transition-gain matrix for the real antennas, namely the elements of which correspond to real replacements of radiation diagram. A $2 \times (N_{anvirH} \times N_{anvirV})$ matrix is obtained for each of the $N_{trarea}$ transitions.

In step 50, there is defined and evaluated the transition-gain matrix for the virtual antennas, namely the elements of which correspond to real rotations in the plane H. A $2 \times (N_{anvirH} \times N_{anvirV})$ matrix is obtained for each of the $N_{travirH}$ transitions.

Finally, in step 60, there is defined and evaluated the transition-gain matrix for the virtual antennas, namely the elements of which correspond to real rotations in the plane V. A $2 \times (N_{anvirH} \times N_{anvirV})$ matrix is obtained for each of the $N_{travirV}$ transitions.

In the context considered herein, by "transition-of-antenna solution" (hereinafter referred to also more synthetically as "antenna transition") is meant any variation in the characteristics of the antenna that will enable passage from one of the possible $N_{antot}$ antenna solutions A to one of the possible antenna solutions B; in what follows, said transformation will be indicated as "antenna transition AB".

In general, the total number $N_{tratot}$ of possible antenna transitions AB between the $N_{antot}$ antenna solutions available is given by the number of orderly pairs of different antennas, expressed by the relation:

$$N_{tratot} = N_{antot} \times (N_{antot} - 1) \tag{2}$$

where $N_{tratot}$ is the total number of transitions AB between $N_{antot}$ antenna solutions.

In the framework of design and planning of a mobile-radio communication network, it is reasonable to hypothesize some restrictions on the concept of antenna transition. In particular, it may be assumed that transitions are performed that each time vary at most only one of the three types of antenna diagrams considered (simple transition). In other words, the three types of antennas described are considered uncoupled, excluding a priori all the transitions (the so-called hybrid or multiple transitions) that imply simultaneous variation of real antenna, virtual antenna of type H, and virtual antenna of type V (i.e., the change of antenna model and corresponding pointing both in the horizontal plane H and in the vertical plane V).

It should be noted how the choice of using exclusively simple transitions will not limit the potentialities of application of the technique described herein, in so far as the simplification adopted does not set limitations of any sort on the shapes of antenna diagram that can be used, since any antenna diagram belonging to the $N_{antot}$ antenna diagrams available can be selected by resorting at most to three simple transitions in series (i.e., a succession of simple transitions corresponding to: a change of model, a rotation of the pointing in the horizontal plane H, and a variation of tilt in the vertical plane V).

In the case where recourse is had to the simple transitions only, the total number $N^S_{tratot}$ of useful transitions is reduced sensibly with respect to that indicated by Equation (2); the value of the number of possible simple transitions within the set of real antennas $N^S_{tratot}$ can be obtained as follows.

If $N_{trarea}$, $N_{travirH}$ and $N_{travirV}$ are, respectively, the number of possible transitions within the set of real antennas, the number of virtual antennas of type H, and the number of virtual antennas of type V, it follows that:

$$N_{tratot}^S = N_{trarea} + N_{travirH} + N_{travirV}$$

where the number $N_{trarea}$ of possible transitions within the set of real antennas is:

$$N_{trarea} = N_{anrea} \times N_{anvirH} \times N_{anvirV} \times (N_{anrea} - 1)$$

the number $N_{travirH}$ of possible transitions within the set of virtual antennas of type H is:

$$N_{travirH} = N_{anrea} \times N_{anvirH} \times N_{anvirV} \times (N_{anvirH} - 1)$$

the number $N_{travirV}$ of possible transitions within the set of virtual antennas of type V is:

$$N_{travirV} = N_{anrea} \times N_{anvirH} \times N_{anvirV} \times (N_{anvirV} - 1)$$

From the foregoing expressions it follows that the total number $N^S_{tratot}$ of simple transitions is:

$$N_{tratot}^S = N_{antot} \times (N_{anrea} + N_{anvirH} + N_{anvirV} - 3) \tag{3}$$

The Applicant has, on the other hand, found that the antenna transitions (or transitions of radiation diagram) have as direct effect a variation of the antenna gain G in the directions each time considered. In fact, if a certain direction of analysis has been fixed, to a given antenna transition there can correspond a specific variation of the gain G; if the analysis is extended to all the N useful directions considered, this enables the effect of the antenna transitions to be represented by as many values of the corresponding variation of gain G.

According to a preferred embodiment of the present invention the effects of an antenna transition can hence be represented by means of the variations in the level of gain G as a function of the direction examined, associating uniquely said variations to the set of available antenna solutions. Said approach corresponds to a sectoring of the space, which, in a polar reference system with the antenna set at the centre, is partitioned into elements of solid angle $\Omega(h, v)$ with axis $s(h, v)$ assumed as discretized direction associated thereto.

The generic direction of pointing $s(h, v)$ amongst the $(N_{anvirH} \times N_{anvirV})$ possible directions, where:
- $h = 1, \ldots, N_{anvirH}$, and
- $v = 1, \ldots, N_{anvirV}$,
- identifies an element of solid angle $\Omega(h, v)$.

Figure 3:
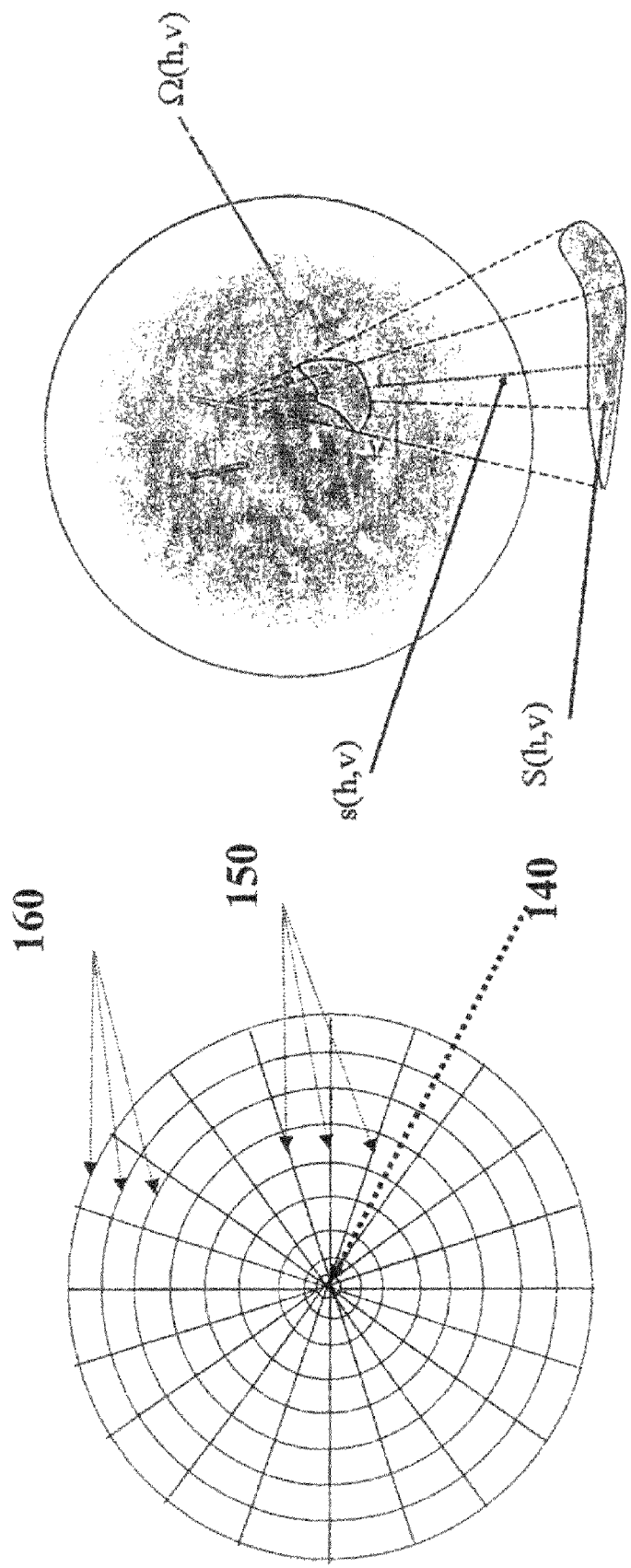
FIG. 3a shows an example of sectoring of the volume covered by an antenna in the horizontal plane H (azimuth) and vertical plane V (tilt)
FIG. 3b shows an example of characterization of the aforesaid sectoring in three dimensions (3D)

With reference to FIG. 3a, number 140 designates the position of the radio base station considered, number 150 designates the sectoring on the horizontal plane H into $N_{anvirH}$ parts, and number 160 designates the sectoring on the vertical plane V into $N_{anvirV}$ parts.

In particular, with reference to FIG. 3a, the vertical plane V is partitioned into v circular sectors by a series of concentric circumferences having their centre in the radio base station 140, whilst the horizontal plane is partitioned into h spherical wedges via straight lines passing through the radio base station 140.

It should moreover be noted how the operation of sectoring into elements of solid angle $\Omega$(h, v) is performed in a virtual space, designated in what follows as "space of the gains" or "space of the radiation diagrams", which is irrespective of a particular geographical area or real portion of the mobile-radio network.

In physical reality, where the antenna occupies a given position in a specific territorial geographical context, the angular sectoring into elements of solid angle $\Omega$(h, v) with the corresponding axes s(h, v) suggests a corresponding sectoring of the territory into elements of area S(h, v) intercepted by $\Omega$(h, v) on the territory, each of which subtends the corresponding solid angle $\Omega$(h, v) in the direction s(h, v).

FIG. 3b provides an example of characterization of the sectoring in 3D. The element of solid angle $\Omega$(h, v) is projected in the direction s(h, v) and forms the element of area S(h, v).

It is known to persons skilled in the sector of mobile-radio-network planning that the choice of the values of $N_{anvirH}$ and $N_{anvirV}$ is a function of the resolution with which the radiation diagrams of the various antennas and the environmental characteristics of the territory are known. In particular, a knowledge of the radiation diagram or gain is required with an angular resolution in azimuth and tilt at least equal to (and possibly higher than) that used for sectoring the space of the gains in order to have available at least one value (possibly more than one) of the radiation diagram for each of the elements of solid angle $\Omega$(h, v). That choice corresponds, in the case of application to a real configuration of a mobile-radio network, to the evaluation of the mean value of the gains available in each sectors S(h, v).

Figure 4:
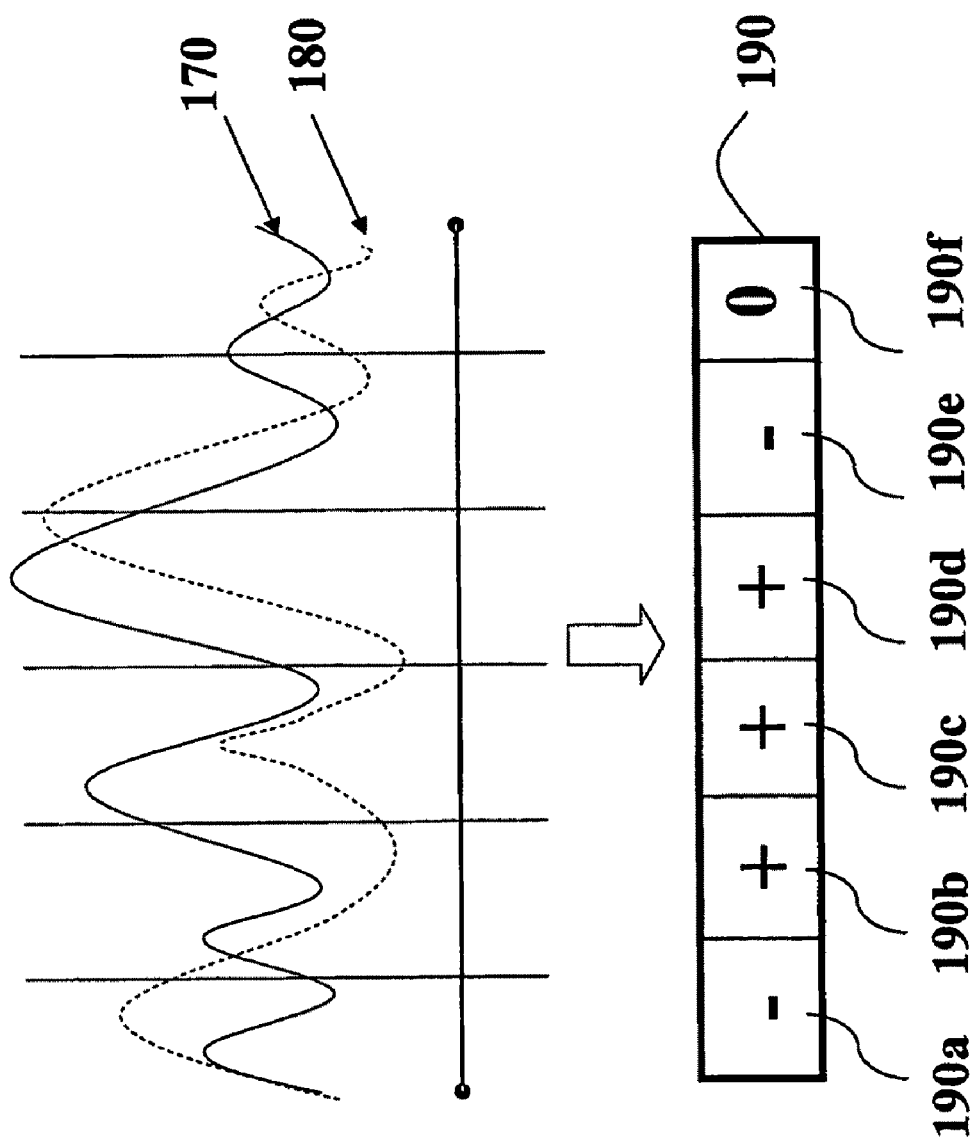
FIG. 4 shows an example of determination of the correlation between a pair of radiation diagrams.
Figure 5:
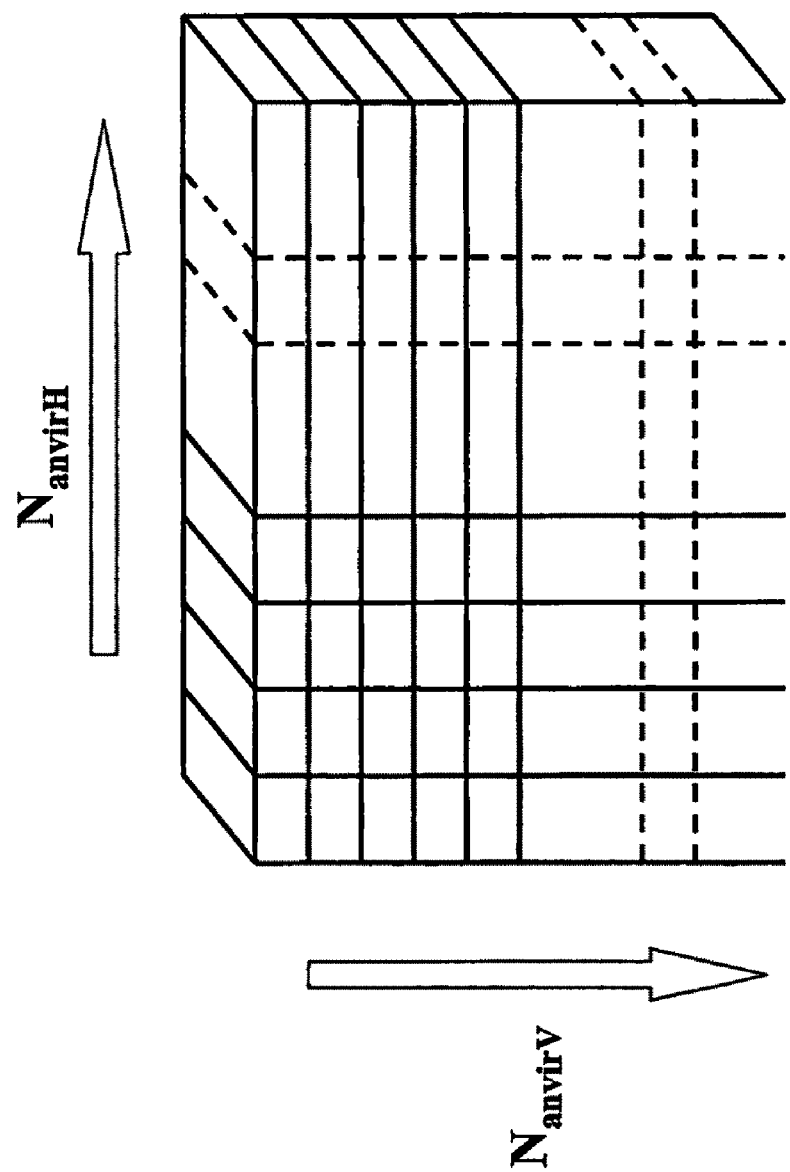
FIG. 5 shows a structure of a transition-gain matrix according to the present invention.

The total effect of an antenna transition AB can be represented by determining ($N_{anvirH} \times N_{anvirV}$) values of gain variation associated to as many encoding values (0, +, −) as clarified in what follows with reference to FIG. 4. These values are organized in a two-level matrix referred to as transition-gain matrix and designated by $GT^{AB}$ (l, h, v), the structure of which is schematically represented in FIG. 5. It should be noted how the level index l can assume only the values 1 and 2, whilst the indices h and v assume the values given above.

From a formal standpoint, the process described is represented schematically in the flowchart of FIG. 1, and it is instantiated, in particular, with reference to blocks 40, 50 and 60, underlying which is the hypothesis of considering exclusively simple transitions thus reducing the number of admissible transitions and the corresponding number of transition-gain matrices (GT).

As regards the preferred embodiment for the definition and evaluation of the transition-gain matrices, the procedure is as given in what follows.

Let A and B be two antenna solutions and $G_A$ and $G_B$ be the corresponding radiation diagrams understood as gain function. Let, moreover, A and B be linked by a simple transition considered in the direction (A, B), to which there corresponds the transition-gain matrix $GT_{AB}$(l, v, h); the generic element of the first level of the matrix is defined as the mean value of the difference of the gains $G_B$ and $G_A$, evaluated in the interval of solid angle $\Omega$(h, v), which can be formally represented as:

$$GT^{A,B}(1,h,v) = _{\Omega(h,v)}\langle (G_B - G_A) \rangle \qquad (4.1)$$

where the mean value operator is to be understood as extending to all the values of the gains known in the range of solid angle identified by $\Omega$(h, v).

From the preceding definition, it is clear how a positive value of the generic element $GT^{AB}$ (1, h, v) indicates that the replacement of the antenna A with the antenna B has, as effect, in the element of solid angle $\Omega$(h, v), an average increase in the gain; symmetrically, a negative value of an element of the first level of the transition matrix indicates, instead, an average decrease in the gain in the corresponding element of solid angle. That approach suggests synthesizing the information of the first level of GT in a second level in which indications of a "logic" nature are contained according to whether there is an increase in the gain (+), a decrease in the gain (−), or an equal gain (0) for the portion of solid angle identified by the element h, v of the transition matrix, as illustrated, for example, in FIG. 4.

In the example of FIG. 4, the plot represented by a continuous line 170 refers to the gain associated to the antenna B, the plot represented by a dotted line 180 refers to the gain associated to the antenna A, whilst each element 190a, 190b, 190c, 190f, 190f of a vector 190 indicates the sign of the mean value of the difference between the plots considered, evaluated in the interval of solid angle $\Omega$(h, v). In particular, the elements 190a, 190e of the vector 190 indicate that by replacing the antenna A with the antenna B an average decrease (−) in the gain can be obtained in the portion of solid angle identified by the element h, v of the transition matrix; the elements 190b, 190c, 190d indicate that by replacing the antenna A with the antenna B an average increase (+) in the gain can be obtained while the element 190f indicates that by replacing the antenna A with the antenna B an equal gain (0) can be obtained.

In greater detail, the elements of $GT^{AB}$(2, h, v) are determined according to what is given in Table 1, where ε (real variable) represents a configuration parameter of the procedure of calculation of the matrix GT. This parameter assumes, in general, "small" values (for example of the order of one dB or fractions thereof; in this context, 0.5 dB may be considered a "small" value) for the purpose of highlighting a condition in which the antenna transition does not have any appreciable effects on the gain.

TABLE 1

| Second level of the transition-gain matrix | Conventional sign of the logic content |
| --- | --- |
| $\|GT^{AB}(2, h, v)\| \leq \epsilon$ | 0 |
| $GT^{AB}(2, h, v) > \epsilon$ | + |
| $GT^{AB}(2, h, v) < -\epsilon$ | − |

Figure 6:
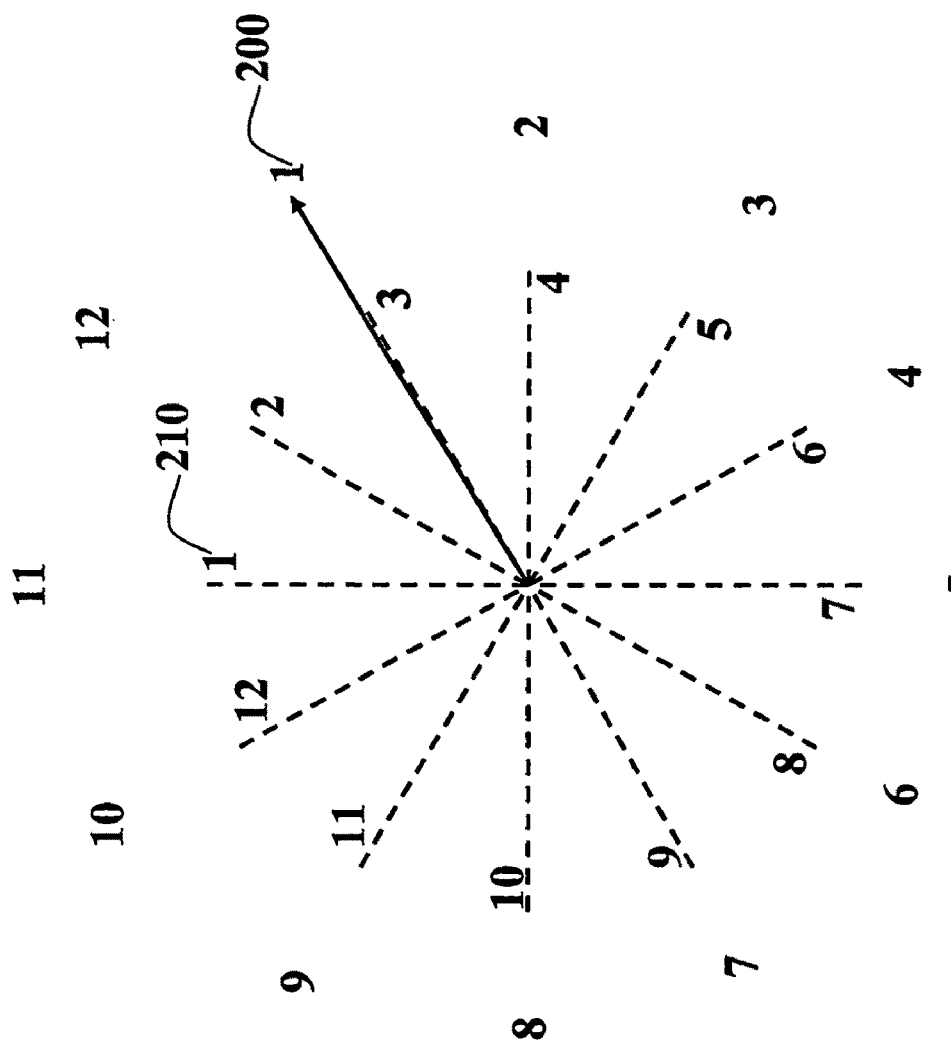
FIG. 6 shows an example of intrinsic and cartographic reference system.

According to the approach described herein, which quantifies the effects of antenna transition (simple transitions) with the aid of the transition-gain matrix, the treatment of transitions between real antennas does not formally differ from the one that can be used for transitions between virtual antennas. There exists, however, a difference in the treatment of the transitions between real antennas with respect to the transitions between virtual antennas when the resulting effects must be given in a real cartographic reference system of the territory, as illustrated in FIG. 6, where the mobile-radio communication network considered is in operation.

In fact, for the antenna transitions that correspond to a true replacement of the radiation diagram (real antennas), the treatment is the traditional one, which envisages, in the step of installation, an alignment of the axis of the radiating structure with the pointing (azimuth) that is desired to assign to the cell. In said procedure, the angular characteristics of the radiating structure (radiation diagram) are given in the cartographic reference system. More specifically, the radiation diagram of the antenna is represented with respect to an intrinsic angular reference system 200 aligned with the axis of the radiating structure; the real angular reference of the territory 210 is indicated by the numbers on the outer circumference in FIG. 6, whereby the origin (direction starting from which the angles are measured, designated by 1 in FIG. 6) is generally the direction of maximum gain of the antenna. The choice of the pointing of an antenna is made in the real angular reference of the territory 210 aligned with the cartographic North. The real angular reference of the territory 210 is designated by the numbers on the inner circumference in FIG. 6, and envisages as initial direction the geographical North designated by 1 in FIG. 6.

Assuming, for example, that the pointing chosen is in the direction 3 of the real angular reference of the territory 210, from an analytical standpoint, pointing the antenna means aligning the direction 1 of the real angular reference of the territory 210 with the direction 3 of the real angular reference of the territory 210.

Instead, for the antenna transitions that represent rotations of the pointing of an antenna (virtual antennas) with the same formalism used for the antenna replacements, in the step of installation of the apparatus it is necessary first of all to rotate in the cartographic real space the pointing of the cell by the same angular amount as the virtual transition of the first type (azimuth) or of the second type (elevation) considered and then to proceed, according to standard modalities, with the installation proper of the antenna in its real configuration, with the physical axis aligned with the (new) pointing of the cell.

For example, in the case of a typical directive radiation diagram characterized by a main lobe of 60° and by a gain of 18 dB, if, for example, a rotation transition of 90° in a clockwise direction is selected, the characteristics of the lobe of the antenna remains unaltered and its maximum gain shifts by 90° in a clockwise direction.

In other words, said action is equivalent to having available two different models of antenna, both characterized by a lobe of 60° with a gain of 18 dB, the first one, real, having a gain of 18 dB in the direction of its own axis of structural pointing and the second, virtual, having the same gain in a direction rotated through 90° with respect to the axis of structural pointing. The insertion in the network of the virtual diagram hence corresponds to a rotation through 90° in a clockwise direction of the original pointing of the antenna in its real configuration or shape.

Figure 7:
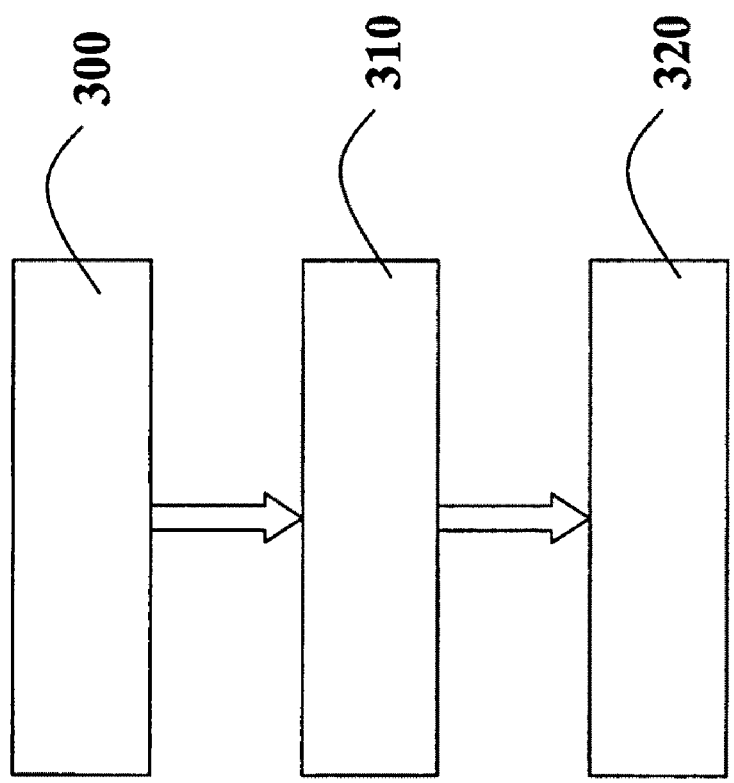
FIG. 7 shows a functional block diagram exemplary of a further set of operations to be carried out according to the present invention.

Next, a set of operations is carried out, according to the steps indicated in FIG. 7, on a specific configuration of mobile-radio communication network cr (formed by a plurality of cells $N_{cells}$) and on a set of cartographic data that characterize the territory on which said mobile-radio communication network will be located.

With particular reference to FIG. 7, the block diagram presented describes the steps for the definition and estimation of the cell-desiderata matrix.

By way of reference, it will be assumed that there is available a software tool for planning mobile-radio networks of second generation (e.g., GSM) and/or third generation (e.g., UMTS), for instance of the type described in the document WO-A-02/35872.

In particular, for each cell comprised in the mobile-radio communication network, the corresponding coverage area and, consequently, the interference levels induced by each cell of the network on each of the other cells examined are assumed as being known. It is moreover assumed that said information of an electromagnetic nature is known with a spatial resolution, or minimum element of the territory on which it is defined (in what follows referred to as pixel), preferably smaller than (or at most equal to) the size of the sector S(h, v) of minimum extent into which the cell itself is assumed to be partitioned. The dimensions of a pixel can for example vary from 5 m×5 m (high spatial resolution) up to 50 m×50 m (low spatial resolution).

For a given network configuration, a set of requirements or desiderata (specifically referred to each sector of each cell examined) to be satisfied can be identified in order to overcome any possible critical elements—such as, for example, the orographic conformation of the territory (and hence the difficulty in guaranteeing coverage), the concentration of the traffic offered (and hence problems of capacity), the conditions of marked interference, etc., present in the territory involved in the planning—so as to guarantee an increase in performance both of the cell itself and of the mobile-radio communication network as a whole.

In particular, for each portion of territory defined with the sectoring process, the parameter "desiderata" is given by the need to increase, decrease, or leave unaltered the level of useful signal for the purpose of controlling as well as possible the area covered, the level of interference, the carried traffic, etc.

It should be noted how by the term "cell" is meant, in said context, the area of territory best served, from the electromagnetic standpoint, by a single antenna installed on a specific physical support (tower, pylon, etc.). Consequently, by the term "site" is indicated, as known to a person skilled in the mobile-radio sector, the union of a number of cells, and hence of different radiating apparatuses, comprised between 1 (single-sector site) and 4 (four-sector site).

Given a certain mobile-radio-network configuration cr, the definition of the cell desiderata presupposes an operation of partition into sectors of the physical space in which the cell is located (cell area), which, in a preferred embodiment, is carried out using the same discretization parameters introduced for the preceding definition of the set of matrices $GT^{AB}$ (l, v, h).

According to said choice, the set of the directions s(h, v) and of the sectors S(h, v) which subtend, at the RBS, a solid angle equal precisely to Ω(h, v) is obtained. In this context, the reference system (which, in the case of the cell desiderata, operates in the physical space that surrounds the radio base station) is represented by the territorial cartographic system adopted for all the operations of planning of the mobile-radio network and evaluation of the corresponding performance, whilst, in the case of the transition-gain matrices, it should be emphasized how the reference system in question operates in an intrinsic virtual space, referred to as space of the gains.

In order to facilitate definition of an efficient criterion of "intersection" between the concepts of cell desiderata and transition gain, a matrix formalism is adopted similar, as regards characteristics and dimensions (in terms of rows and columns), to the one previously described.

It is moreover useful to associate to the value that describes the desiderata on an individual sector S(h, v) an evaluation of the "priority" (to be understood as an estimate of how much it is necessary to satisfy said desiderata) associated to said desiderata, a choice that entails a two-level cell-desiderata matrix. The matrix in question is designated by $Dcr^C(l, v, h)$, where:

$C=1, 2, \ldots, N_{cells}$ represents the $N_{cells}$ of the mobile-radio-network configuration examined;

$l=1, 2$ distinguishes the two levels of information content of the matrix; and $h=1, 2, \ldots, N_{anvirH}$, and
$v=1, 2, \ldots, N_{anvirV}$, are the angular indices which identify the sector $S(h, v)$ and the direction $s(h, v)$ already introduced in the step of definition of the transition-gain matrix.

In addition, the notation Dcr is meant to highlight the dependence of the quantity "desiderata" upon the particular mobile-radio-network configuration cr examined.

With reference to FIG. 7, in a step 300, the network of $N_{cells}$ configured thanks to a release present in field or identified at the preceding optimization step. The cartography of the geographical area is considered.

In a step 310, the area of the cell considered is partitioned into $N_{anvirH}$ angular sectors in the horizontal plane H and into $N_{anvirV}$ angular sectors in the vertical plane V. The real cartographic reference system is considered, centred on the position of the individual cell, with angles measured, for example, in a clockwise direction starting from the cartographic North.

In a step 320, the cell-desiderata matrix is defined and evaluated. Said matrix presents two levels of ($N_{anvirH} \times N_{anvirV}$) elements each. A matrix for each of the N cells is thus obtained.

The cell-desiderata matrix $Dcr^C(l, v, h)$ can be defined, from the operating standpoint, on the basis of a series of indicators of network operating functionality (for example area covered, carried traffic, level of useful signal, interference) corresponding to the overall mobile-radio network considered. Obviously, in the step of a search for a criterion of evaluation of the cell desiderata it is necessary to take into account aspects such as the reliability of the result (understood as concrete capacity of identifying correctly the requirements of the mobile-radio network to be planned) and the efficiency of calculation of the process which determines said result.

As a preferred embodiment of a mode of definition of the two-level cell-desiderata matrix, the criterion of evaluation considered regards the mean level of the signal (radio coverage) and the interference level perceived in each of the sectors $S(h, v)$ of the cell examined.

As regards the quantity "desiderata" (corresponding to the second level of the matrix, in a similar way to what has been described for the case of the transition-gain matrix), it is formally represented by the symbols "+", "−", "0", "?" each one of which is associated to the indication of a different requirement and, namely, to: increased useful signal, decreased useful signal, same useful signal, and absence of indications in accordance with Table 2. Said table provides the symbols used for definition of the cell desiderata on a sector basis.

As regards priority (corresponding to the first level of the matrix), this can assume integer values comprised between 0 (minimum priority) and $N_{anvirH} \times N_{anvirV}$ (maximum priority) equal to the total number of sectors of the cell; it should be noted how the value zero is conventionally assigned to the sectors for which the methodology of analysis described does not provide useful indications (symbol "?").

TABLE 2

| Conventional sign | Meaning of the desiderata | Notes |
|---|---|---|
| + | Increase in the extent of the sector | — |
| − | Decrease in the extent of the sector | — |
| 0 | No variation | — |
| ? | Indifferent | Sector characterized by contrasting indications coming from information on coverage and interference |

In a preferred embodiment of the present invention, the determination of the cell-desiderata matrix $Dcr^C(l, v, h)$ is based upon assessments linked, on the one hand, to the radio-electric coverage and on the other to the interference undergone by a generic cell. In particular, for this purpose, the quantity "coverage potential gain" $GPCcr^C(h, v)$ referred to the sector $S(h, v)$ of the generic cell C, is introduced, being defined by the relation:

$$GPCcr^C(h, v) = \frac{Ncr^C(h, v)_{not\ covered}}{\langle Acr^C(h, v)_{not\ covered}\rangle - \langle Acr^C(h, v)_{covered}\rangle} \quad (5)$$

where the numerator is the number of non-covered pixels corresponding to the sector $S(h, v)$ of the cell C and the denominator the difference (expressed in dB) between the mean value of attenuation of the non-covered pixels and the mean value of attenuation of the covered pixels, both referring, of course, to the same sector $S(h, v)$. On the basis of the definition given, the coverage advantage and, hence, the tendency towards evaluation of a "desideratum" with conventional sign "+" associated thereto, is directly proportional to the number of non-covered pixels and inversely proportional to the mean increase in the level of signal necessary for "reaching" the pixel in question.

As regards the interference undergone, the estimation can be made resorting to quantities known to persons skilled in the sector and, namely, to the intercell-interference factor $fcr^C$, which, in the case, for example, of third-generation networks such as UMTS, is commonly referred to the up-link (i.e., the link between the mobile terminal and the RBS) and is expressed by the ratio between the interference induced in the cell C by the mobile terminals supported by the other cells in the mobile-radio network and the interference induced in the cell C by the mobile terminals power-controlled by the cell C itself. In the specific case considered and described herein, the intercell-interference factor is particularized for each of the sectors $S(h, v)$ of the cell C and is designated, from a formal standpoint, by the symbol $fcr^C(h, v)$.

On the basis of the coverage potential gain $GPCcr^C(h, v)$ and of the interference factor $fcr^C(h, v)$, the elements of the cell-desiderata matrix $Dcr^C(2, h, v)$ are given according to the scheme summarized in Table 3, where Sp and Sf (real variables) represent two configuration parameters of the algorithm of calculation of the cell-desiderata matrix. In principle, Sp and Sf can assume any value, and their explicit value assignment forms part of the "calibration" of the process of configuration considered.

TABLE 3

| Coverage gain Interference level | Desiderata |
|---|---|
| $GPCcr^C(h, v) > Sp$<br>$Fcr^C(h, v) \leq Sf$ | $Dcr^C(2, h, v) = +$ |
| $GPCcr^C(h, v) \leq Sp$<br>$Fcr^C(h, v) > Sf$ | $Dcr^C(2, h, v) = -$ |
| $GPCcr^C(h, v) \leq Sp$<br>$Fcr^C(h, v) \leq Sf$ | $Dcr^C(2, h, v) = 0$ |
| $GPCcr^C(h, v) > Sp$<br>$Fcr^C(h, v) > Sf$ | $Dcr^C(2, h, v) = ?$ |

As mentioned previously, the first level of the cell-desiderata matrix $Dcr^C(1, h, v)$ regards the value of the priority associated to the various interventions identified, i.e., the degree of "importance" attributed to the execution, in the sector $S(h, v)$, of the operation of widening "+", narrowing "−" or maintenance "0" of the extent of the radio-electric coverage, signalled by means of the corresponding element $Dcr^C(2, h, v)$ of the cell-desiderata matrix itself.

The set of priorities thus represents a tool through which it is possible to classify, within a generic cell, the sectors and operations to be favoured during variation of the characteristics of the antenna used for providing the radio-electric coverage. According to a preferred embodiment, the value of the priority is an integer belonging to the interval [0, $N_{anvirH} \times N_{anvirV}$] and is assigned subsequent to division of the elements of the first level of the cell-desiderata matrix according to the symbols ("+", "−", "0"), which describe, as has repeatedly been emphasized, the different types of intervention possible.

In such a context, it is important to note how no priority is assigned to the non-defined desiderata (sign "?"), a condition expressed by the assignment of a conventional value of priority equal to zero. The elements of the cell-desiderata matrix $Dcr^C(2, h, v)$ thus divided are then ordered according to different criteria, summarized schematically in Table 4.

In particular, the elements characterized by the symbols "+" and "−" are ordered according to decreasing values of coverage potential gain $GPCcr^C(h, v)$ and intercell-interference factor $fcr^C(h, v)$, respectively.

The elements with the associated symbol "0" are ordered, instead, according to increasing values of the least between coverage potential gain $GPCcr^C(h, v)$ and intercell-interference factor $fcr^C(h, v)$ of the element itself.

According to the criterion of selection so far illustrated, between the sectors that are to undergo an extension of coverage (which corresponds to desiderata having the sign "+") the ones characterized by the highest values of the coverage potential gain are entered in the first positions of the list, whereas, amongst the sectors that are to maintain unaltered the extent of the coverage itself (to which there corresponds a "desideratum" having the sign "0"), the ones having associated thereto the lowest values either of coverage potential gain or of interference undergone are set first; finally, between the sectors selected for a reduction of the coverage (desiderata with the sign "−") the ones characterized by a high level of the interference undergone are entered in the first positions of the corresponding list.

The criterion of assignment of the priority value used envisages, in a preferred embodiment of the solution described herein, an order which, given the same position in each category, will respect the direction:

+→0→− up to complete exhaustion of the available elements.

As a result of this, the highest priority, equal to $N_{anvirH} \times N_{anvirV}$, is assigned to the sector $S(h, v)$ with a value of the cell desiderata $Dcr^C(2, h, v)$ having the sign "+" and with a maximum value of coverage potential gain $GPCcr^C(h, v)$; the subsequent value, equal to $(N_{anvirH} \times N_{anvirV} - 1)$ is assigned, instead, to the sector $S(h, v)$ with a value of the cell desiderata $Dcr^C(2, h, v)$ having the sign "0" and with the smallest value between coverage potential gain $GPCcr^C(h, v)$ and intercell-interference factor $fcr^C(h, v)$; finally, the third priority value, equal to $(N_{anvirH} \times N_{anvirV} - 2)$ is attributed to the sector $S(h, v)$ with a value of the cell desiderata $Dcr^C(2, h, v)$ having the sign "−" and with a maximum value of intercell-interference factor $fcr^C(h, v)$. The process of assignment proceeds, consistently with the sequence "+→0→−", up to assignment of the priority to all the sectors taken into consideration.

Figure 8:
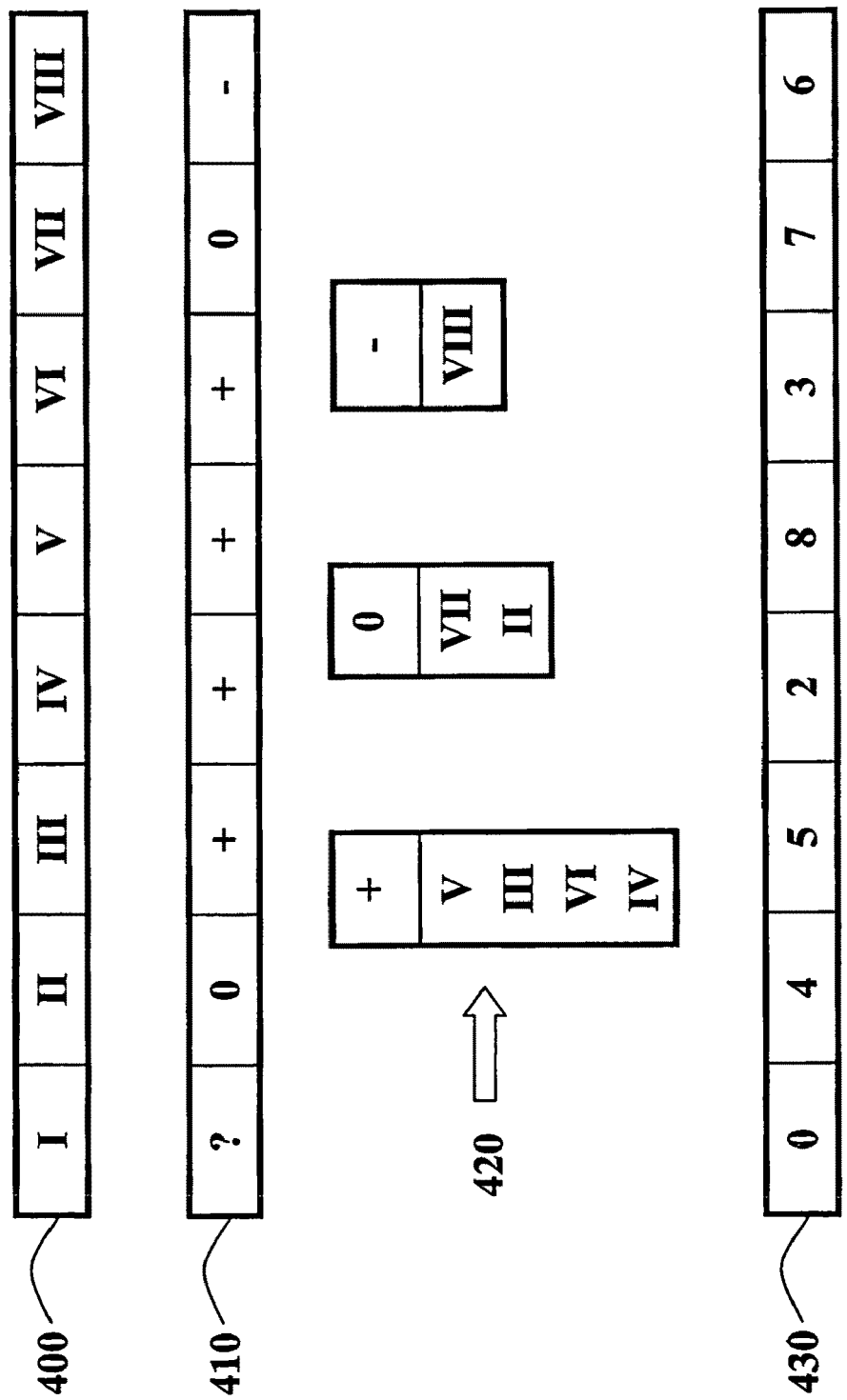
FIG. 8 shows an example of allotting priorities of intervention for a cell partitioned into eight sectors.

An example of application of the mechanism of assignment of the priority $Dcr^C(1, h, v)$ to the desiderata $Dcr^C(2, h, v)$ of the various sectors into which a generic cell C is partitioned, is illustrated in FIG. 8 with reference to a partitioning of the useful area into eight sectors (h=4, v=2), corresponding basically to values of angular partition equal to XX° (in the horizontal direction) and YY° (in the vertical direction).

With reference to FIG. 8, number 400 designates a vector with eight positions that identify the eight sectors considered. The reference 410 designates an eight-position vector containing the values of the desiderata, whilst the reference 420 designates the lists of the actions (each list is ordered on the basis of a reference parameter introduced hereinafter in Table 6). Finally, the reference 430 designates an eight-position vector in which the priority values assigned are stored.

Given in the vector 410 is the attribution of the desiderata $Dcr^C(2, h, v)$ obtained, through the application of the method, for the various sectors. The sectors are partitioned into the three categories, given in the lists designated by 420, defined on the basis of the encoding "+", "0", "−" and, within the individual categories, are ordered as a function of the values of coverage potential gain $GPCcr^C(h, v)$ and intercell-interference factor $fcr^C(h, v)$ hypothesized; finally, the attribution of the priority $Dcr^C(1, h, v)$ that derives from the application of the criterion set forth is given.

It should be noted how a zero priority is attributed to the sector with associated encoding equal to "?", in so far as interventions are not carried out thereon; the sector classified first in the category "+", (characterized by the highest value of coverage potential gain $GPCcr^C(h, v)$) has the maximum priority value of the "desideratum" assigned, and so forth, with the first sector classified with "0" and the following sectors classified according to the criteria previously illustrated.

TABLE 4

| Desiderata | + | 0 | − | ? |
|---|---|---|---|---|
| Parameter used for ordering | $GPCcr^C(h, v)$ | $Min[GPCcr^C(h, v), fcr^C(h, v)]$ | $fcr^C(h, v)$ | n.a. |
| Type of ordering | Decreasing | Increasing | Decreasing | n.a. |

An important aspect of the solution described herein lies precisely in the fact that it is not at all necessary to provide any precise quantification (for example, 0.5 dB, 1 dB, and so forth). The effects of a possible antenna transition can in fact be evaluated simply in terms of absence of appreciable effects (0) or else in terms of increase (+) or decrease (−) referred to conventional values. The result is an extreme simplification of the procedure and a corresponding reduction in the associated computational load.

Figure 9:
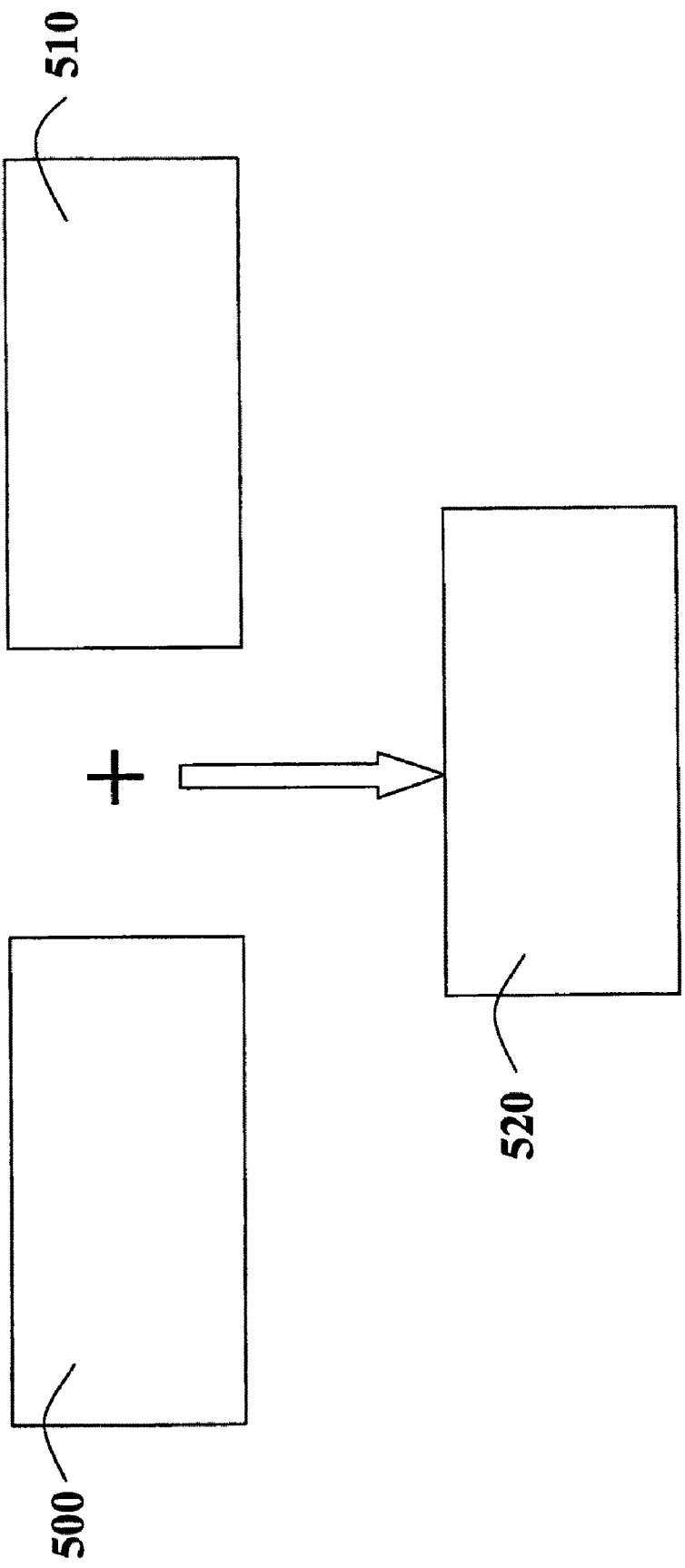
FIG. 9 shows a functional block diagram exemplary of another set of operations to be carried out according to the present invention.

With reference to FIG. 9, there follows a description of the method of definition and estimation of the advantage-of-transition matrix. In particular, in a step 500, the set of the $N^S_{tratot}$ transition-gain matrices is identified, where $N^S_{tratot}$ identifies the number of simple transitions possible within the set of real antennas. In a step 510, the set of the $N_{cells}$ cell-desiderata matrices is identified, where $N_{cells}$ identifies the number of cells of the network configuration. Finally, in a step 520, the advantage-of-transition matrix is defined and evaluated. Said matrix contains ($N_{cells}$, $N_{antot}-1$) elements, and there exists one matrix for each of the configurations of N cells considered.

Once there have been defined the set of the potential antenna solutions available, formally represented by the transition-gain matrices $GT^{AB}(l, h, v)$ obtained in step 500, and the set of the optimization requirements (i.e., the requirements for improving the performance) of a particular network configuration cr, formally represented by the cell-desiderata matrix $Dcr^C(l, h, v)$ obtained in step 510, it is possible to provide an "operative interaction" between the requirements linked to the contingent situation of the mobile-radio network and the available antenna solutions, which, at a formal level, entails the use of a criterion of interaction between the set of the cell desiderata $Dcr^C(l, h, v)$ and the set of the transition gains $GT^{A^CB}(l, h, v)$.

In greater detail, for a given network configuration, it is possible to define a quantity, referred to as "advantage of transition", which, for each cell C of the network configuration considered and for each possible antenna transition, will quantify the advantage of that particular transition performed on that particular cell.

From a formal standpoint, a matrix notation can advantageously be used, defining the advantage-of-transition matrix $VTcr(C, A^CB)$, where cr emphasizes that the matrix depends upon the particular network configuration.

In its most general form, this matrix can be represented by the relation:

$$VTcr(C,A^CB)=\Psi[Dcr^C(l,h,v),GT^{A^CB}(l,h,v)] \quad (6)$$

where:

$\Psi$ represents a matrix function (that will be defined in the following of the present specification);

$A^CB=1, 2, \ldots, (N_{antot}-1)$ represents the index associated to the simple transition from the specific antenna $A^C$ mounted on the cell C to the antenna B, that is one of the ($N_{antot}-1$) possible other antenna choice;

$C=1, 2, \ldots, N_{cells}$ represents the index associated to the individual cell.

It should be noted that in defining the advantage-of-transition matrix nothing changes, at a formal level, if also the hybrid transitions were to be considered, with the exception, of course, of an increase in the total number of available transitions and, hence, of elements constituting the matrix.

The role of the advantage-of-transition matrix VTcr proves particularly important in an operating context in which, for obvious reasons of efficiency of the interventions that can be made on the mobile-radio network, it is desired to limit the number of the cells on which to intervene by means of an adaptation of the parameters of antenna configuration (antenna transition), albeit continuing to pursue the maximum positive effects on the overall performance of the network. In said operating context, once the number of cells $N_{cellstran}$ on which it is desired to evaluate an antenna transition is fixed, the final aim is to identify on which cells to intervene and what antenna transition to carry out on the cells identified. The optimal response involves, in principle, identification of the $N_{cellstran}$ largest (i.e., most significant) elements of the advantage-of-transition matrix VTcr, selection of the cells associated thereto (row indices), and carrying out of the corresponding transitions (column indices).

In the context outlined above, it may prove advantageous to weight the elements of the advantage-of-transition matrix VTcr with a different factor according to the type of transition involved (real, virtual in the plane H, and virtual in the plane V), in order to define, in the process of evaluation of the antenna transitions, the different operating impact of each type of intervention to be carried out in field. For example, in the case of an antenna of a traditional type provided with remote control of the tilt, transitions of a virtual type in the plane V are to be preferred to transitions of a virtual type in the plane H, since they are easier to make; this characteristic can be managed through values of the advantage-of-transition matrix VTcr such as to favour partially, during the choice of the optimal transition, the corresponding type of intervention, in particular in a context in which the optimum of the network performance is affected (also) by the costs of intervention on the network itself.

Before illustrating in detail the preferred embodiment of the process of definition of the advantage-of-transition matrix VTcr, it should be emphasized how the matrix in question represents a global quantity capable of quantifying, by means of a single real dimensionless value, the advantages due to a specific antenna transition $A^CB$ made on the generic cell C of the network configuration cr. Even so, it may be noted how this is a relative quantity and not an absolute one, in so far as it has the purpose of setting one against another, and hence ordering, the set of the possible interventions on the cells of the mobile-radio-network configuration analysed according to the potential advantages that can be obtained in terms of expected performance.

In such a context, the advantage-of-transition matrix VTcr thus assumes the role of tool useful for selecting, starting from a given network configuration obtained by using a software planning tool for instance of the type described in the document WO-A-02/35872, a reduced number of new, "potentially optimum", network configurations, on which the detailed analysis (which generally proves somewhat costly in terms of processing times required) concentrates.

Figure 10:
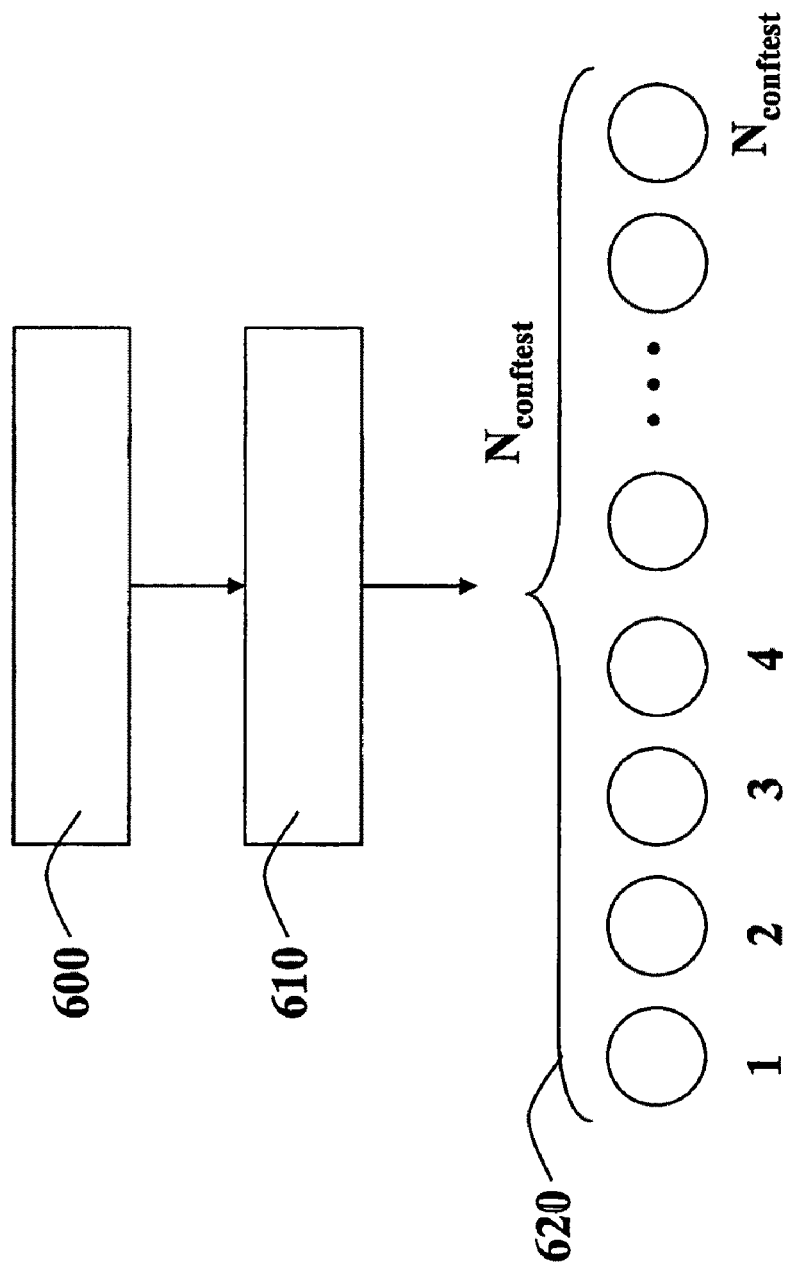
FIG. 10 shows a functional block diagram exemplary of another set of operations to be carried out according to the present invention.

Specifically, with reference to FIG. 10, in a step 600, the advantage-of-transition matrix for the network configuration at the i-th step or at the initial step is defined. Defined in a step 610 is the functional relation between configurations to be tested and the advantage-of-transition matrix. In the same step 610, the values are moreover chosen for the parameters:

$N_{celltran}$ number of cells treated with a single diagram-transition move; and $N_{confest}$ number of configurations tested.

The reference 620 designates the set of the $N_{confest}$ network configurations to be tested. Said network configurations are obtained starting from the network configuration at the i-th step or initial step with $N_{celltran}$ cells, on which the radiation diagram has varied and on which exhaustive analysis will then be carried out by determination of the weight function and consequent identification of the network configuration at the i+1-th step.

According to a preferred embodiment, the process of definition of the advantage-of-transition matrix $VTcr(C, A^CB)$ is based upon the introduction of an intermediate matrix called benefit matrix, designated by the symbol $Bcr^{C,A^CB}(l, h, v)$. The benefit matrix is useful for maintaining a detail at the level of the sectors $S(h, v)$ and is defined for each pair of entities (cell C, transition $A^CB$); also in this case, the information is split into two levels, whence it follows that l=1, 2.

More specifically, the benefit matrix $Bcr^{C,A^CB}(1, h, v)$ is the result of the application of an antenna transition $A^CB$, characterized by the relative transition gain $GT^{A^CB}(1, h, v)$ to a cell C, which is in turn described through its own desiderata $Dcr^C(l, h, v)$.

In particular, the first level of the benefit matrix $Bcr^{C,A^CB}(1, h, v)$ is equivalent to the analogous level of the transition-gain matrix $GT^{A^CB}(1, h, v)$, with an attribution of sign, in this case dependent upon the pair of logic values (l=2) of the cell desiderata and of the transition gain. As highlighted in Table 5, the mechanism of attribution of the signs is consistent with the aim of obtaining a quantity of positive sign whenever there exists a correspondence between what the cell "desires" (in terms of coverage level) and what the transition "offers" (i.e., what the transition can guarantee); for example, in the presence of a "desideratum" that indicates the need for an increase of coverage (sign "+") and a coverage gain that is positive and greater than the threshold (sign "+"), the element associated to the first level of the benefit matrix will assume a positive value. Instead, the lack of agreement between the requirements (desiderata) and the effect of the intervention entails a negative value of the element associated to the first level of the benefit matrix.

The second level of the benefit matrix $Bcr^{C,A^CB}(2, h, v)$ (see Table 5) represents a synthesis of what is contained at the first level and is represented by an integer value that can assume positive values in the range (0, 3). Also in this case, there exists a direct proportionality between the numerical value and the degree of correspondence between the cell "desideratum" and the transition gain. A benefit value equal to 3 is attributed to the pairs (0, 0), (+, +) and (−, −), which express a coherence between requirement and effect, whilst a benefit value equal to 1 is attributed to the pairs that express an opposition (+, −) and (−, +). The benefit value equal to 0 corresponds, instead, to the conditions in which it has not been possible to define the "desideratum" (of value "?") on account of the contrasting indications coming from the coverage and interference information, whilst a value of 2 is assigned to the remaining cases.

With reference to the premises illustrated above, the advantage-of-transition matrix can be represented, for the generic cell C and the antenna transition AB by means of the following relation:

$$VTcr(C, A^CB) = K_1 * \sum_{h,v} Bcr^{C,A^CB}(2, h, v) + \ldots + \qquad (7)$$

$$K_2 * \sum_{h,v} Bcr^{C,A^CB}(2, h, v) * Dcr^C(1, h, v) + \ldots +$$

$$K_3 * \sum_{h,v} Bcr^{C,A^CB}(2, h, v) * Bcr^C(1, h, v)$$

It is to be noted that the formal structure of the relation (7) is characterized by the presence of three addenda, which in turn contain a summation over all the sectors S(h, v) of the cell C, whereas the constant $K_1$, $K_2$ and $K_3$ are three configuration parameters of the algorithm of definition of the advantage-of-transition matrix, which enable variation of the relative weight between the three terms mentioned. In principle, $K_1$, $K_2$ and $K_3$ can assume any value, and assignment of their explicit value forms part of the "calibration" of the process of configuration considered.

More in particular, the first term of the relation (7) represents the intersection between the "logic" values of the "desideratum" of the cell C and of the gain of antenna transition $A^CB$. The value of this term is the greater, the greater the number of sectors of the cell C on which there is "agreement" between what is required of the sector and what can be obtained, once again on the sector, by the change of antenna diagram taken into consideration.

In the second term, the "logic" benefit of the first term is allotted a value weighed by means of a multiplying factor product, which is once again carried out at the level of sector and then summed over all the sectors, with the importance or priority of the requirements or desiderata of the sector itself.

Finally, in the third term, the same "logic" benefit of the first term is assigned a value weighed by means of a multiplying factor product, which is once again carried out at the level of sector and then summed over all the sectors, with the analog level of the benefit itself, which, except for an appropriate attribution of the sign (see the third column of Table 5), is, in turn, the effect of the change $A^CB$ of radiation diagram (analog level of the transition gain).

| Desiderata $Dcd^c(2, h, v)$ | Transition gain $GT^{A^CB}(2, h, v)$ | Benefit $Bcr^{C,A^CB}(1, h, v)$ | Benefit $Bcr^{C,A^CB}(2, h, v)$ |
|---|---|---|---|
| 0 | 0 | $-|GT^{A^CB}(1, h, v)|$ | 3 |
| 0 | + | $-|GT^{A^CB}(1, h, v)|$ | 2 |
| 0 | − | $-|GT^{A^CB}(1, h, v)|$ | 2 |
| + | 0 | $GT^{A^CB}(1, h, v)$ | 2 |
| + | + | $GT^{A^CB}(1, h, v)$ | 3 |
| + | − | $GT^{A^CB}(1, h, v)$ | 1 |
| − | 0 | $-|GT^{A^CB}(1, h, v)|$ | 2 |
| − | + | $-|GT^{A^CB}(1, h, v)|$ | 1 |
| − | − | $-|GT^{A^CB}(1, h, v)|$ | 3 |
| ? | 0 | 0 | 0 |
| ? | + | 0 | 0 |
| ? | − | 0 | 0 |

Consequently, without prejudice to the underlying principles of the invention, the details and the embodiments may vary, also appreciably, with reference to what has been described by way of example only, without departing from the scope of the invention as defined by the annexed claims.

The invention claimed is:

1. A method for selecting from a plurality of available radiation diagrams, the radiation diagram of an antenna for serving a cell in a mobile-radio communication network, comprising:

classifying said plurality of available radiation diagrams in terms of a related radiation gain value associated with each sector of a plurality of sectors in which each cell of said mobile-radio communication network is partitioned;

identifying for each one of said sectors a plurality of variations of said radiation gain value associated with a plurality of variations of configuration of said available radiation diagrams;

estimating for each sector an initial value of at least one indicator of network operative functionality;

estimating for each sector at least a desiderate value of variation of the related radiation gain value which involves an improvement of said initial value of said at least one indicator of network operative functionality; and selecting in said plurality of variations of configuration of available radiation diagrams, at least one configuration that approximates said variation of said radiation gain value involving said desiderate value.

2. The method of claim 1, further comprising selecting the current configuration of the radiation diagram associated with the cell in the absence of said variation of said radiation gain value in each sector.

3. The method of claim 1, wherein said plurality of available radiation diagrams comprises one or more radiation diagrams of a traditional type of antenna.

4. The method of claim 1, wherein said plurality of available radiation diagrams comprises one or more radiation diagrams of a re-configurable antenna.

5. The method of claim 1, wherein said plurality of variations of configuration of said available radiation diagrams comprises at least a variation corresponding to the replacement of the type of antenna.

6. The method of claim 1, wherein said plurality of variations of configuration of said available radiation diagrams at least a variation corresponding to a different orientation of the radiation diagram.

7. The method of claim 6, wherein said different orientation is a different vertical orientation of said radiation diagram.

8. The method of claim 7, wherein said different orientation is a different horizontal orientation of said radiation diagram.

9. The method of claim 1, wherein said at least one indicator of network operative functionality is a radio-coverage parameter within each sector.

10. The method of claim 9, wherein said desiderate value of variation of radiation gain value is a function of at least said radio-coverage and an interference parameter.

11. The method of claim 1, wherein said estimating said desiderate value of variation of said radiation gain value comprises attributing to said desiderate value different weighting factors for each of said sectors.

12. A system for selecting, from a plurality of available radiation diagrams, the radiation diagram of an antenna for serving a cell in a cellular communication network, the system capable of being configured for performing the method of claim 1.

13. A cellular communication network comprising a plurality of cells served by respective antennas having radiation diagrams selected according to the method of claim 1.

14. A non-transitory computer-readable storage medium comprising instructions in the form of software-code portions, which when executed by a computer, are capable of performing the method of claim 1.

* * * * *